(12) United States Patent
Reeve

(10) Patent No.: US 8,016,302 B1
(45) Date of Patent: Sep. 13, 2011

(54) HUMAN-POWERED TRICYCLE SYSTEM

(76) Inventor: Curtis T. Reeve, St. Petersburg, FL (US)

( * ) Notice: Subject to any disclaimer, the term of this patent is extended or adjusted under 35 U.S.C. 154(b) by 0 days.

(21) Appl. No.: 12/804,345

(22) Filed: Jul. 20, 2010

(51) Int. Cl.
*B62D 61/06* (2006.01)
(52) U.S. Cl. ............... 280/62; 280/5.509; 280/124.103
(58) Field of Classification Search ............ 280/5.509, 280/62, 124.103, 210, 267
See application file for complete search history.

(56) References Cited

U.S. PATENT DOCUMENTS

| | | | |
|---|---|---|---|
| 3,309,097 A * | 3/1967 | Seeber | 280/5.508 |
| 3,561,778 A * | 2/1971 | La Brie | 280/7.14 |
| 4,351,410 A * | 9/1982 | Townsend | 180/210 |
| 4,634,137 A * | 1/1987 | Cocksedge | 280/256 |
| 4,659,106 A * | 4/1987 | Fujita et al. | 280/124.103 |
| 4,685,690 A * | 8/1987 | Fujita et al. | 280/124.103 |
| 6,367,824 B1 * | 4/2002 | Hayashi | 280/62 |
| 6,817,617 B2 * | 11/2004 | Hayashi | 280/5.509 |
| 7,073,806 B2 * | 7/2006 | Bagnoli | 280/267 |
| 7,530,419 B2 * | 5/2009 | Brudeli | 180/210 |
| 7,568,541 B2 * | 8/2009 | Pfeil et al. | 180/210 |

* cited by examiner

*Primary Examiner* — J. Allen Shriver, II
*Assistant Examiner* — Bridget Avery

(57) ABSTRACT

A frame has rear, upper and front components. A rear wheel and two laterally spaced spindles with wheels are supported by the front frame component. A steering assembly includes a steering shaft, a handle bar and horizontal steering rods. The steering shaft has an upper end, a lower end and a central extent. The shaft is rotatably supported in the front frame component. The handle bar is coupled to the upper end of the steering shaft. The horizontal steering rods pivotally couple the lower end of the steering shaft to the steering rods. In this manner steering purposes is facilitated. A suspension assembly includes an upper and lower wishbone subassemblies. Each wishbone subassembly has front and rear wishbone arms. Two outboard carriers are provided. The carriers are adapted to function as parallelograms while riding.

2 Claims, 5 Drawing Sheets

FIG. 3
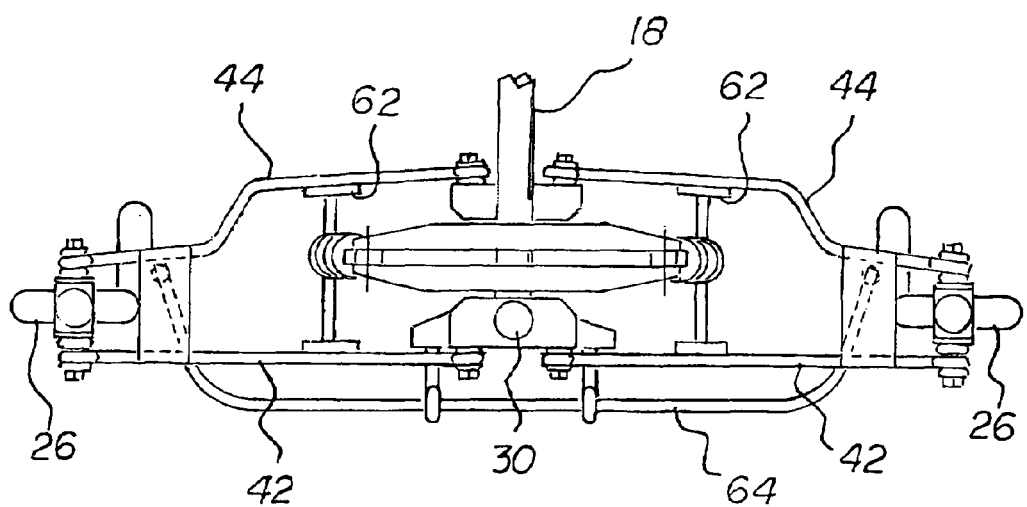
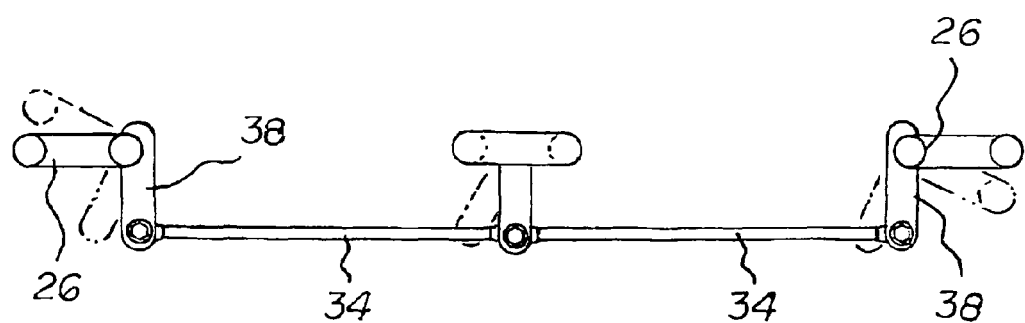
FIG. 4

FIG 5
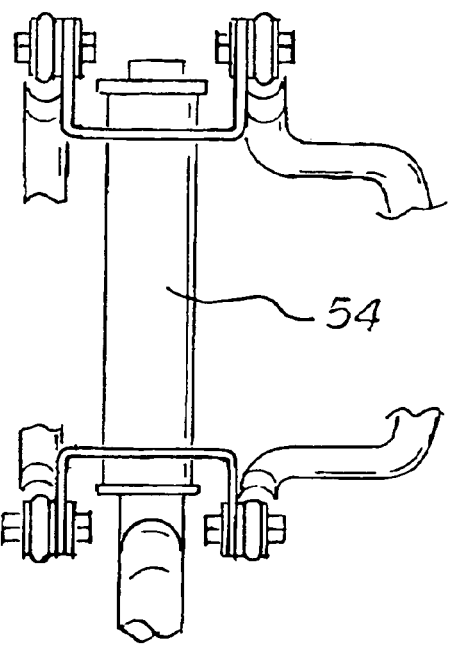
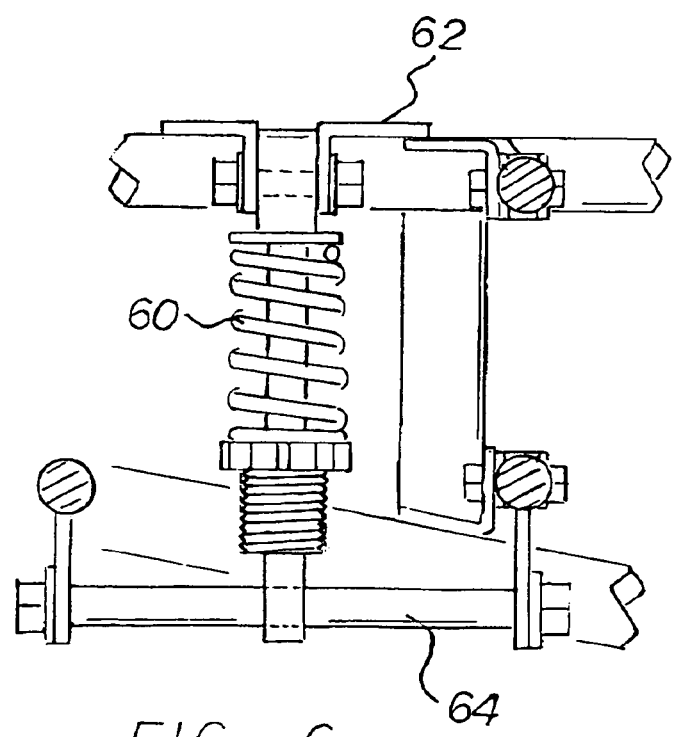
FIG 6

FIG. 7
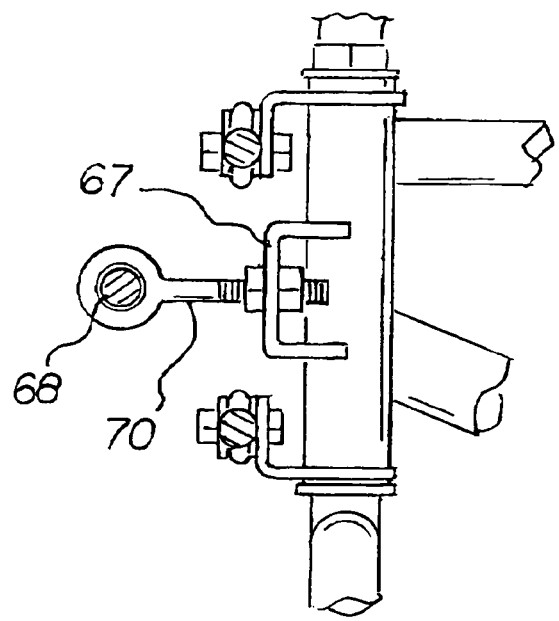
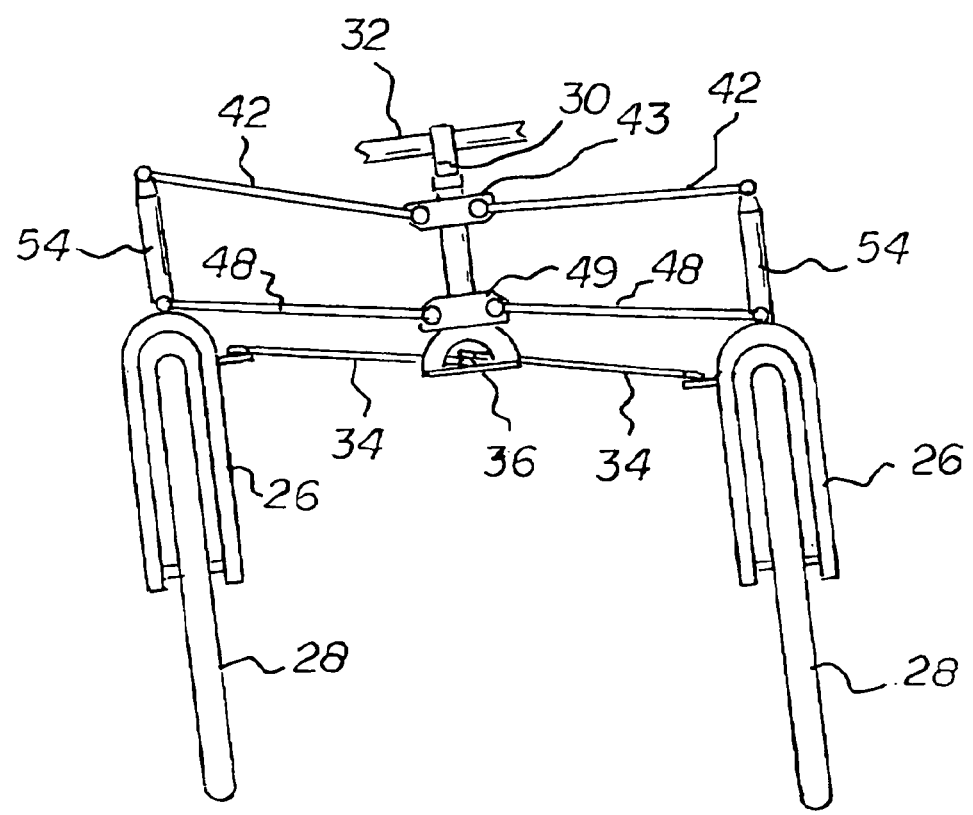
FIG 8

HUMAN-POWERED TRICYCLE SYSTEM

BACKGROUND OF THE INVENTION

Field of the Invention

The present invention relates to a human-powered tricycle system and more particularly pertains to independently suspending two front wheels, the suspension being safe, efficient and economical.

SUMMARY OF THE INVENTION

In view of the foregoing disadvantages inherent in the known types of tricycle systems of known designs and configurations now present in the prior art, the present invention provides an improved human-powered tricycle system. As such, the general purpose of the present invention, which will be described subsequently in greater detail, is to provide a new and improved human-powered tricycle system and method which has all the advantages of the prior art and none of the disadvantages.

To attain this, the present invention essentially comprises a human-powered tricycle system. First provided is a frame. The frame has a rear frame component. The frame has an essentially horizontal upper frame component. The frame also has an essentially vertical, hollow front frame component.

A rear wheel is provided. The rear wheel is rotatably supported by the rear frame component. Two laterally spaced spindles are provided. The spindles are supported by the front frame component. A front wheel is also provided. The front wheel is rotatably supported by each spindle.

Provided next is a steering assembly. The steering assembly includes a steering shaft. The steering shaft has an upper end. The steering shaft has a lower end. The steering shaft also has a central extent. The steering shaft is supported in the front frame component. In this manner the steering shaft may rotate about a central axis. The steering assembly includes a handle bar. The handle bar is coupled to the upper end of the steering shaft. The steering assembly also includes horizontal steering rods. Each steering rod has an interior end and an exterior end. The steering assembly includes a welded pitman arm. The welded pitman arm pivotally couples the lower end of the steering shaft to the interior ends of the steering rods. The steering assembly further includes steering linkages. The steering linkages pivotally couple the spindles to the exterior ends of the steering rods. The handle bar is rotatable by a rider of the system. In this manner the steering rods are moved and the spindles are rotated about laterally spaced axes parallel with the central axis. Further in this manner steering is facilitated.

A suspension assembly is provided. The suspension assembly includes an upper wishbone subassembly. The upper wishbone subassembly includes two forward rods. The upper wishbone subassembly includes two rearward rods. Each rod has an interior end and an exterior end. The interior ends of the forward rods of the upper wishbone subassembly are pivotally coupled with respect to the front frame component. The interior ends of the rearward rods of the upper wishbone subassembly are pivotally coupled with respect to the upper frame component. The upper wishbone subassembly further includes a joining strut.

The suspension assembly also includes a lower wishbone subassembly. The lower wishbone subassembly includes two forward wishbone arms. The lower wishbone subassembly includes two rearward wishbone arms. Each wishbone arm has an interior end and an exterior end. The interior ends of the forward wishbone arms of the lower wishbone subassembly are pivotally coupled with respect to the front frame component. The interior ends of the rearward wishbone arms of the lower wishbone subassembly are pivotally coupled with respect to the upper frame component with a joining strut.

The suspension assembly also includes two outboard carriers. Each carrier has an upper end and a lower end. The lower end of each carrier is attached to and extends upwardly from an associated spindle. The exterior end of each upper wishbone arm is pivotally attached to the upper end of an associated carrier. The exterior end of each lower wishbone arm is pivotally attached to the lower end of an associated carrier. The ends of the wishbone arms are pivotable about parallel, essentially horizontal axes. In this manner the wishbone arms and the carriers function as parallelograms while riding.

A cushioning assembly is provided. The cushioning assembly includes two coil springs. Each coil spring has an upper end and a lower end. The cushioning assembly includes upper support plates. The upper support plates are coupled to the upper frame. The upper support plates pivotally receives the upper ends of the coil springs. The cushioning assembly further includes two lower support shafts. The lower support shafts are coupled to the lower wishbones. The lower support shafts pivotally receive the lower ends of the coil springs. The cushioning assembly functions to smooth the a ride while turning.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved human-powered tricycle system which has all of the advantages of the prior art tricycle systems of known designs and configurations and none of the disadvantages.

It is another object of the present invention to provide a new and improved human-powered tricycle system which may be easily and efficiently manufactured and marketed.

It is further object of the present invention to provide a new and improved human-powered tricycle system which is of durable and reliable constructions.

An even further object of the present invention is to provide a new and improved human-powered tricycle system which is susceptible of a low cost of manufacture with regard to both materials and labor, and which accordingly is then susceptible of low prices of sale to the consuming public, thereby making such human-powered tricycle system economically available to the buying public.

Even still another object of the present invention is to provide a human-powered tricycle system for independently suspending two front wheels, the suspension being safe, efficient and economical.

Lastly, it is an object of the present invention to provide a new and improved human-powered tricycle system. A frame has rear, upper and front components. A rear wheel and two laterally spaced spindles with wheels are supported by the front frame component. A steering assembly includes a steering shaft, a handle bar and horizontal steering rods. The steering shaft has an upper end, a lower end and a central extent. The shaft is rotatably supported in the front frame component. The handle bar is coupled to the upper end of the steering shaft. The horizontal steering rods pivotally couple the lower end of the steering shaft to the steering rods. In this manner steering purposes is facilitated. A suspension assembly includes an upper and lower wishbone subassemblies. Each wishbone subassembly has front and rear wishbone arms. Two outboard carriers are provided. The carriers are adapted to function as parallelograms while riding.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the system taken along line 3-3 of FIG. 2.

FIG. 4 is a bottom view of the system taken along line 4-4 of FIG. 2.

FIG. 5 is a side view of the system taken along line 5-5 of FIG. 2.

FIGS. 6 and 7 are cross sectional views taken along lines 76-6 and 7-7 of FIG. 2.

FIG. 8 is a front elevational view similar to FIG. 2 but illustrating the system while turning.

The same reference numerals refer to the same parts throughout the various Figures.

DESCRIPTION OF THE PREFERRED EMBODIMENT

Figure 1:
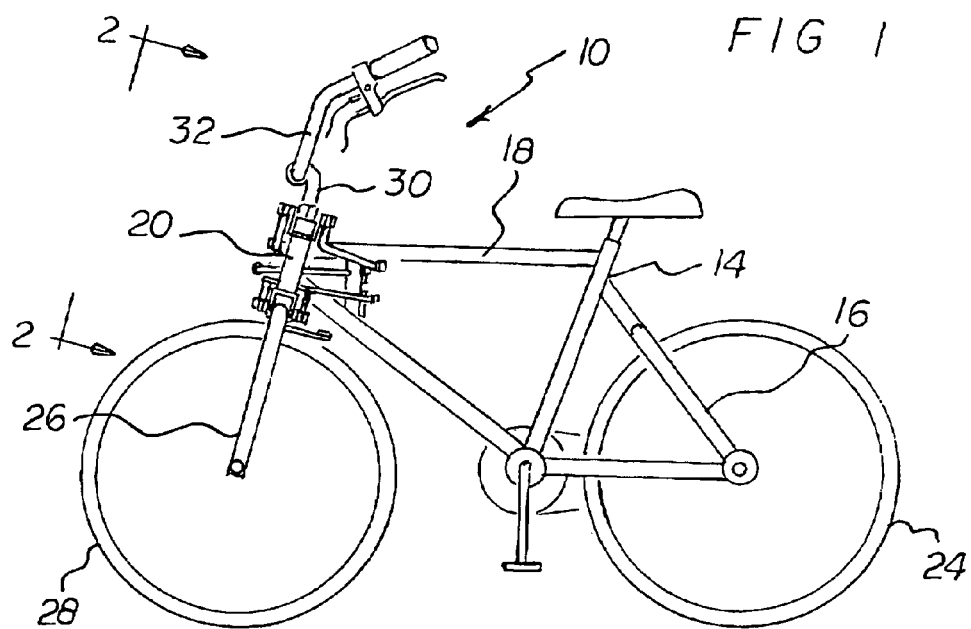
FIG. 1 is a side elevational view of a human-powered tricycle system constructed in accordance with the principles of the present invention.

With reference now to the drawings, and in particular to FIG. 1 thereof, the preferred embodiment of the new and improved human-powered tricycle system embodying the principles and concepts of the present invention and generally designated by the reference numeral 10 will be described.

The present invention, the human-powered tricycle system 10 is comprised of a plurality of components. Such components in their broadest context include a frame, a steering assembly and a suspension assembly. Such components are individually configured and correlated with respect to each other so as to attain the desired objective.

First provided is a frame 14. The frame has a rear frame component 16. The frame has an essentially horizontal upper frame component 18. The frame also has an essentially vertical, hollow front frame component 20.

A rear wheel 24 is provided. The rear wheel is rotatably supported by the rear frame component. Two laterally spaced spindles 26 are provided. The spindles are supported by the front frame component. A front wheel 28 is also provided. The front wheel is rotatably supported by each spindle.

Provided next is a steering assembly. The steering assembly includes a steering shaft 30. The steering shaft has an upper end. The steering shaft has a lower end. The steering shaft also has a central extent. The steering shaft is supported in the front frame component. In this manner the steering shaft may rotate about a central axis. The steering assembly includes a handle bar 32. The handle bar is coupled to the upper end of the steering shaft. The steering assembly also includes horizontal steering rods 34. Each tie rod has an interior end and an exterior end. The steering assembly includes a welded pitman arm 36. The welded pitman arm pivotally couples the lower end of the steering shaft to the interior ends of the steering rods. The steering assembly further includes steering linkages 36. The steering linkages pivotally couple the spindles to the exterior ends of the steering rods. The handle bar is rotatable by a rider of the system. In this manner the steering rods are moved and the spindles are rotated about laterally spaced axes parallel with the central axis. Further in this manner steering is facilitated.

A suspension assembly is provided. The suspension assembly includes an upper wishbone subassembly. The upper wishbone subassembly includes two forward rods 42. The upper wishbone subassembly includes two rearward rods 44. Each rod has an interior end and an exterior end. The interior ends of the forward rods of the upper wishbone subassembly are pivotally coupled with respect to the front frame component. The interior ends of the rearward rods of the upper wishbone subassembly are pivotally coupled with respect to the upper frame component. The upper wishbone subassembly further includes a joining strut 43.

The suspension assembly also includes a lower wishbone subassembly. The lower wishbone subassembly includes two forward wishbone arms 48. The lower wishbone subassembly includes two rearward wishbone arms 50. Each wishbone arm has an interior end and an exterior end. The interior ends of the forward wishbone arms of the lower wishbone subassembly are pivotally coupled with respect to the front frame component. The interior ends of the rearward wishbone arms of the lower wishbone subassembly are pivotally coupled with respect to the upper frame component with a joining strut 49.

The suspension assembly also includes two outboard carriers 54. Each carrier has an upper end and a lower end. The lower end of each carrier is attached to and extends upwardly from an associated spindle. The exterior end of each upper wishbone arm is pivotally attached to the upper end of an associated carrier. The exterior end of each lower wishbone arm is pivotally attached to the lower end of an associated carrier. The ends of the wishbone arms are pivotable about parallel, essentially horizontal axes. In this manner the wishbone arms and the carriers function as parallelograms while riding.

A cushioning assembly is provided. The cushioning assembly includes two coil springs 60. Each coil spring has an upper end and a lower end. The cushioning assembly includes upper support plates 62. The upper support plates are coupled to the upper frame. The upper support plates pivotally receives the upper ends of the coil springs. The cushioning assembly further includes two lower support shafts 64. The lower support shafts are coupled to the lower wishbones. The lower support shafts pivotally receive the lower ends of the coil springs. The cushioning assembly functions to smooth the a ride while turning.

Figure 2:
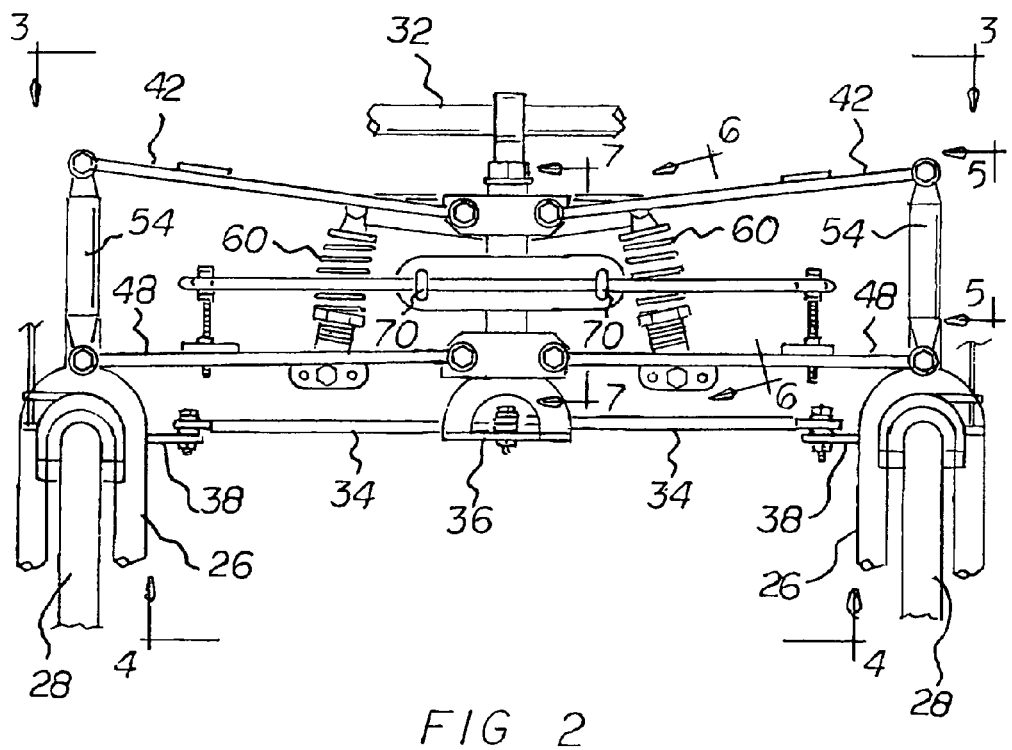
FIG. 2 is a front elevational view of the system taken along line 2-2 of FIG. 1.
Figure 2A:
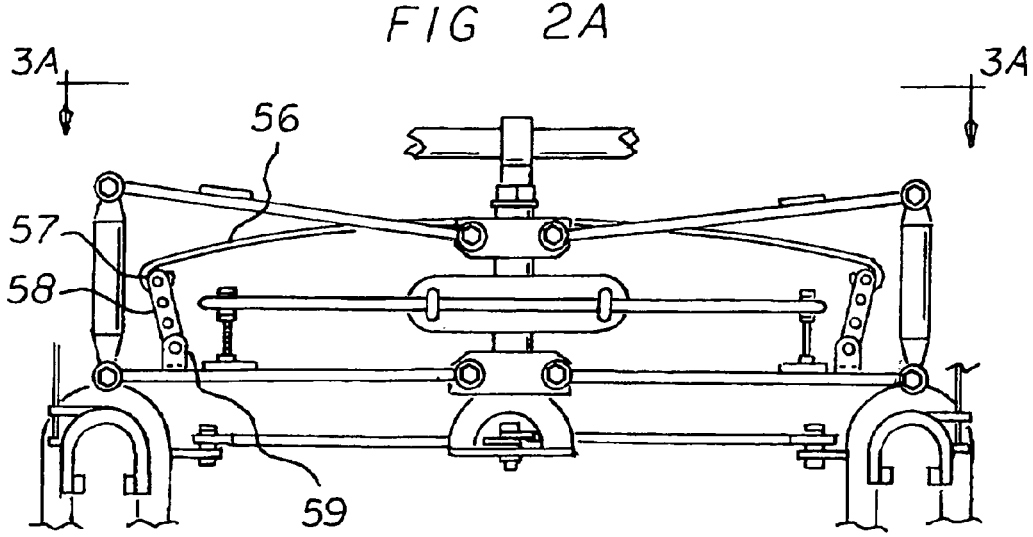
FIGS. 2A and 3A are front elevational and plan views similar to FIGS. 2 and 3 but illustrating an alternate embodiment.
Figure 3A:
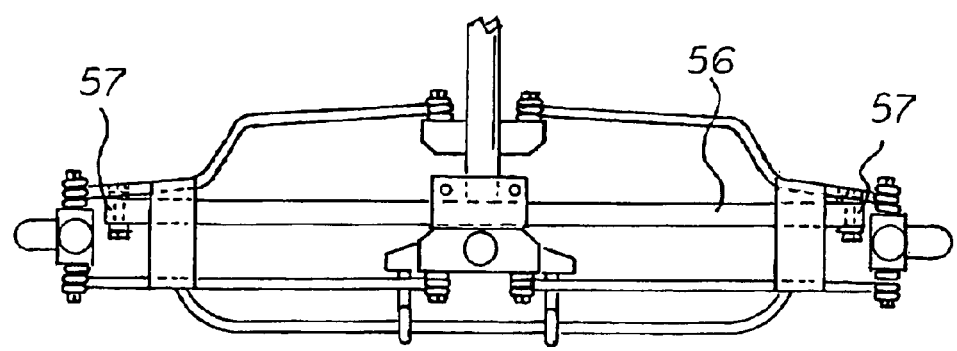

Alternatively, reference is now made to the alternate embodiment of the invention illustrated in FIGS. 2A and 3A. A transverse leaf spring may be used rather than the coil spring arrangement. A transverse leaf spring 56 is provided. The transverse leaf spring is mounted perpendicular to the main frame member of the tricycle. The transverse leaf spring extends outward. The spring eyes 57 include attached spring shackles 58. The spring shackles have eyes on both sides. A shackle mount 59 is provided. The shackle mount is attached on the lower wishbone.

Provided last is an anti-sway bar assembly 67. The anti-sway bar assembly includes an essentially horizontal anti-sway bar 68. The horizontal anti-sway bar has laterally spaced ends. The anti-sway bar has a central extent. The anti-sway bar assembly also includes guides 70. The guides are fixedly positioned to the front frame component between the upper and lower wishbone subassemblies. The guides slidably receive the central extent of the anti-sway bar. The anti-sway assembly is adapted to provide stability to the system while riding.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tricycle system comprising:
    a frame having rear and upper and front frame components, a rear wheel and two laterally spaced spindles with wheels supported by the front frame component;
    a steering assembly including a steering shaft having an upper end and a lower end and a central extent rotatably supported in the front frame component, a handle bar coupled to the upper end of the steering shaft, horizontal steering rods pivotally coupled to the lower end of the steering shaft to the steering rods for steering purposes; and
    a suspension assembly including an upper wishbone subassembly and a lower wishbone subassembly, each wishbone subassembly having front and rear wishbone arms, and two outboard carriers adapted to function as parallelograms while riding; and
    cushioning assemblies including springs coupled to the upper frame and the lower wishbone arms for independently articulated functioning to smooth a ride while turning, the springs including two coil springs, one for each side, each spring functioning independently of the other spring, each coil spring having an upper end and a lower end, upper support plates coupled to the upper frame and pivotally receiving the upper ends of the coil springs, two lower support shafts coupled to the lower wishbone arms and pivotally receiving the lower ends of the coil springs, the cushioning assemblies functioning to smooth the ride while turning.

2. The system as set forth in claim 1 and further including:
    an essentially horizontal sway bar having laterally spaced ends and a central extent, guides fixedly positioned to the front frame component between the upper and lower wishbone subassemblies slidably receiving the central extent of the sway bar, the sway bar adapted to provide stability to the system.

\* \* \* \* \*